R. B. THOMSON.
Colter-Holder for Plows.
No. 200,230. Patented Feb. 12, 1878.
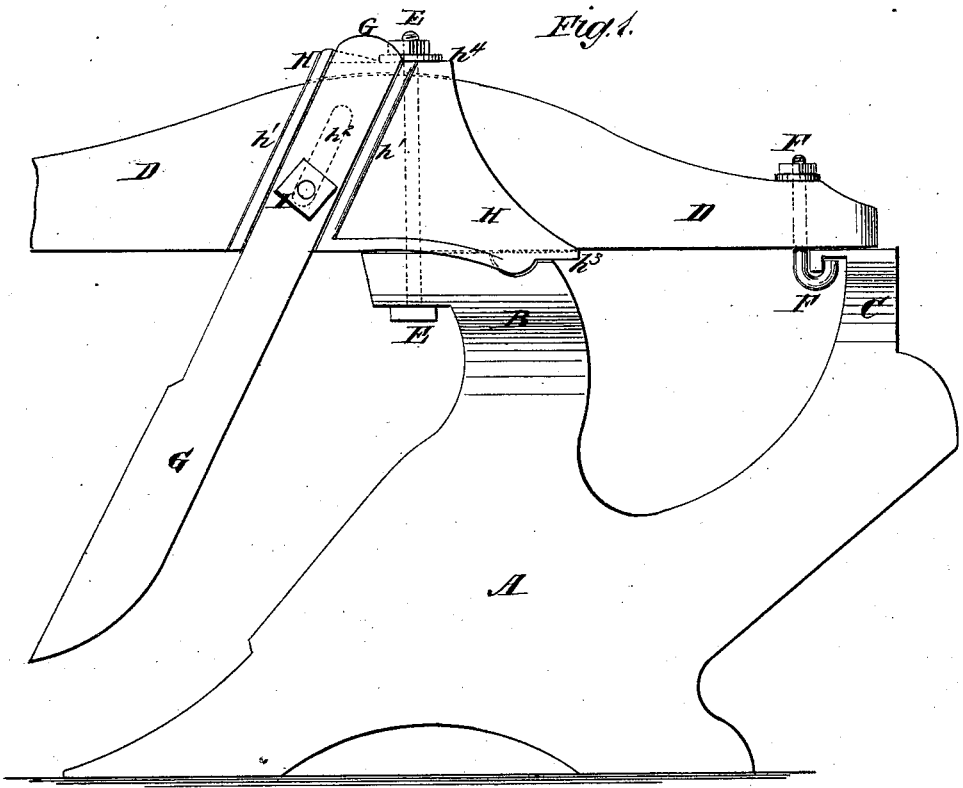
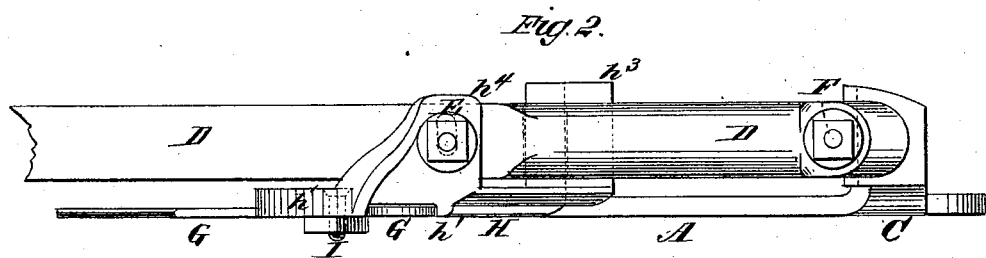
WITNESSES:
Francis McArdle
J. H. Scarborough
INVENTOR:
R. B. Thomson.
BY Munn & Co
ATTORNEYS

UNITED STATES PATENT OFFICE.

ROBERT B. THOMSON, OF DANSVILLE, MICHIGAN.

IMPROVEMENT IN COLTER-HOLDERS FOR PLOWS.

Specification forming part of Letters Patent No. 200,230, dated February 12, 1878; application filed November 23, 1877.

*To all whom it may concern:*

Be it known that I, ROBERT BENJN. THOMSON, of Dansville, in the county of Ingham and State of Michigan, have invented a new and useful Improvement in Colter-Holders for Plows, of which the following is a specification:

Figure 1 is a side view of my improved device, shown as applied to a plow. Fig. 2 is a top view of the same.

Similar letters of reference indicate corresponding parts.

The object of this invention is to furnish an improved device for connecting a colter with a plow, which shall be so constructed as to hold the colter securely in place, and at the same time allow the said colter to be easily and conveniently adjusted to or from the land, and to be raised and lowered, as may be desired.

The invention will first be described in connection with the drawing, and then pointed out in claim.

A represents the plow. B is the forward standard. C is the rear standard, and D is the beam. E is the long bolt that passes down through the beam D, and through the forwardly-projecting part of the top of the standard B. The rear end of the beam D is secured to the rear standard C by a hook-bolt, F, which hooks upon the grooved lower side of the forwardly-projecting part of the top of the rear standard C, and passes up through the rear end of the beam D, so that by loosening the nut of the said bolt F the beam D may be adjusted to take or leave land, as may be desired. G is the colter, the shank of which fits into the space between two inclined heads, $h^1$, formed upon the side of the holder H, where it is secured in place by the bolt I, which passes through a slot, $h^2$, in the holder H, and through a hole in the said shank, so that by loosening the nut of the bolt I the colter G may be raised and lowered, as may be desired. Upon the lower rear part of the holder H is formed a flange, $h^3$, which passes between the beam D and the top of the standard B, and has a head formed upon the forward part of its lower side, to fit into a corresponding groove in the top of the standard B. Upon the upper part of the holder H is formed a flange, $h^4$, which rests upon the top of the beam D, and has a slot formed in it for the long bolt E to pass through, so that by loosening the nut of the said bolt E the holder H may be adjusted laterally to adjust the colter G to or from the land, as may be required.

By this construction, should the colter G strike an obstruction, the flanges $h^3$ $h^4$ will clasp the beam D, so as to throw all the strain upon it, and thus protect the other parts of the plow from being broken.

Having thus described my invention, I claim as new and desire to secure by Letters Patent—

The colter-holder H $h^1$, constructed with the rear flange $h^3$, provided with a cross-rib, and the slotted top flange $h^4$, in combination with the standard B, having a grooved head, and the beam D, substantially as shown and described.

ROBERT BENJAMIN THOMSON.

Witnesses:
FRANCIS M. COBB,
JAMES THOMSON.